INVENTORS
MYRON I. DIETRICK &
DAVID A. WEBB

United States Patent Office 3,389,125
Patented June 18, 1968

3,389,125
LOW EXOTHERM CURING PHENOL-RESORCINOL-FORMALDEHYDE RESINS EMPLOYING ALKALI METAL SULFITES AND CALCIUM COMPOUNDS AS CATALYSTS
Myron I. Dietrick and David A. Webb, Valencia, Pa., assignors to Koppers Company, Inc., a corporation of Delaware
Filed June 23, 1967, Ser. No. 648,343
4 Claims. (Cl. 260—54)

ABSTRACT OF THE DISCLOSURE

A water soluble, fusible phenol-resorcinol-formaldehyde resin which produces a low exotherm upon hardener addition has a composition comprising 50–95 moles phenol and 5–50 moles resorcinol per 100 moles of total phenolic compound and 0.55–0.75 mole of formaldehyde for each mole total phenolic compound. The resin is prepared by reacting phenol and all of the formaldehyde at an initial pH of 8.5–9.0 in the presence of an alkali metal sulfite catalyst in an amount of 0.04–0.09 mole per mole of formaldehyde and refluxing until the mixture has attained a viscosity of 22.7–50 poises. Resorcinol and 0.006–0.060 mole per mole formaldehyde of a calcium catalyst such as calcium oxide, hydroxide or carbonate is added, and the refluxing continued until the resin has a constant viscosity of 200–400 Gardner seconds. The resin is diluted with water or a water miscible solvent to give a solution having a solids content of 40–60% by weight and a viscosity of 3.0–4.3 poises to prepare the resin for use in adhesive formulations.

Background of the invention

In U.S. Patent 3,328,354, a novel, highly reactive storage-stable phenol-resorcinol-formaldehyde resin was described which, in solution, is infinitely dilutable with water. The adhesive is a low odor, rapid curing phenol-resorcinol-formaldehyde resin adhesive having excellent washability, long pot life and excellent bonding characteristics with respect to wood failure and delamination.

The field use of this adhesive uncovered a deficiency in certain applications in that the adhesive mix is exothermic and should be cooled following the addition of the hardener. The exotherm caused by the hardener addition has, at times, resulted in premature gelation of the highly reactive phenol-resorcinol-formaldehyde resin. This may occur when cooling is not applied.

We have now discovered that with the use of a dual catalyst, the alkali metal sulfite catalyst at initial condensation and, at the time of resorcinol addition, a calcium oxide, hydroxide or carbonate catalyst, a resin is produced having the beneficial properties of the novel resin of U.S. Patent 3,328,354, but the resin is less exothermic upon hardener addition. The adhesive is washable, low in formaldehyde odor, has a low exotherm on hardener addition and is stable to storage.

Brief description of drawing

In attached FIGURE 1, there is illustrated by flow diagram the process of the present invention. Reference to FIGURE 1, in conjunction with the following detailed description will better enable an understanding of the invention.

Detailed description

Figure 1:
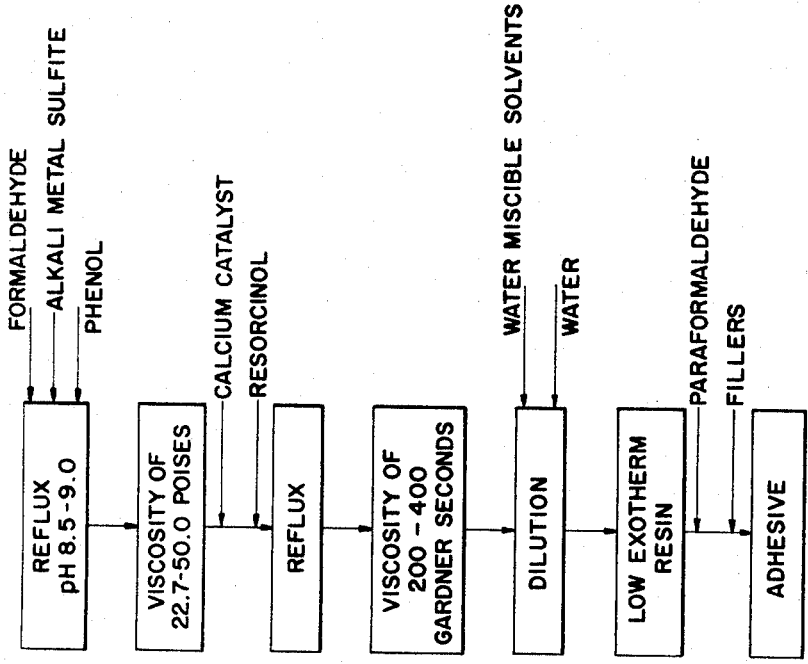

According to the present invention, a water soluble, fusible phenol-resorcinol-formaldehyde resin, characterized by producing only a low exotherm on hardener addition, is formed having a composition comprising 50–95 moles phenol and 5–50 moles resorcinol per 100 moles of total phenolic compound and 0.55–0.75 mole of formaldehyde for each mole total phenolic compound. The resin is made by reacting phenol and all of the formaldehyde in the presence of 0.04–0.09 mole of an alkali metal sulfite catalyst per mole of formaldehyde and refluxing the reaction mixture until the mixture has attained a viscosity of 22.7–50 poises. Resorcinol is then added to the reaction mixture and there is also added 0.006–0.060 mole per mole of formaldehyde, of calcium hydroxide, oxide or carbonate as catalyst. Refluxing is continued until the resin has a constant viscosity of 200–400 Gardner seconds. To prepare the resin for use in adhesive formulations, it is diluted with a water miscible solvent to give a solution having a solids content of 40–60% by weight and a viscosity of 3.0–4.3 poises.

The phenol-resorcinol-formaldehyde resin solution is mixed with paraformaldehyde or paraformaldehyde in one of its higher polymeric forms at a pH of 7.5–9.0 along with conventional fillers and extenders as desired to give the novel adhesive.

The mole ratios of the phenolic compounds varies from 50–95 moles of phenol to 5–50 moles resorcinol per 100 moles of total phenolic compounds. The resorcinol enhances the reactivity of the resin. It is, therefore, necessary to have a minimum of about 5% resorcinol present. When the resin contains an insufficient amount of resorcinol, the temperature required for curing rises considerably, and if the resorcinol is omitted entirely, curing temperatures of 240° F. and higher are required in the absence of a strong catalyst. If more than the maximum amount of resorcinol is used, the cost of the resorcinol component is a deterrent. Thus, to use more than 50% resorcinol to form an adhesive having a solids content of 40–60% would be economically infeasible.

The mole ratio of formaldehyde to the total phenolic portion of the resin is 0.55–0.75 mole per mole of phenolic component. If an excess is used, stability or the resulting resin is impaired which adversely effects both pot life and washability of the adhesive prepared therefrom. There must be a minimum amount of formaldehyde present sufficient to effect substantial condensation of the phenol portion of the resin.

An alkali metal sulfite is required to catalyze the initial condensation reaction. The amount of alkali metal sulfite should be sufficient to produce a pH of about 8.5–9.0. The amount of sulfite, based upon a mole ratio of sulfite to formaldehyde, must be 0.04–0.09 mole of sulfite catalyst per mole of formaldehyde. If less than 0.04 mole of sulfite is used, there is insufficient catalyst to advance the condensation of the resin to the required degree and adhesives prepared therefrom have poor gluing properties, particularly with respect to delamination. If an amount of sulfite greater than 0.09 mole is used, there are undesirable side reactions between the sulfite and the formaldehyde which tend to prevent condensation of the phenol and formaldehyde.

The alkali metal sulfite catalyst useful in the present invention include the sodium potassium and lithium sulfites. Sodium sulfite, being the most economical and the most readily available, is preferred. The bisulfites of the alkali metals are equivalent to sulfites if used in an equivalent amount on an $SO_3$ basis. It has been found that other alkalis such as sodium hydroxide and the like could not be used to prepare the novel resins of the present invention.

The unique nature of the sulfite catalyst may be due to reaction or complexing with the resin. The catalyst appears to some extent to serve as a solubilizing agent permitting more complete reaction between the phenol and formaldehyde and contributes to the greater reactivity of the resin and low phenol odor of the ultimate adhesive.

Following the initial phenol-formaldehyde condensation in the presence of the sulfite catalyst, resorcinol is added together with an additional catalyst, a terminal catalyst, a calcium hydroxide or calcium oxide. It is this addition of the terminal catalyst which produces a resin having a low exotherm upon hardener addition and which permits the use of the resin in various applications. The calcium oxide or calcium hydroxide is added at the end of the phenol-formaldehyde condensation and may react with the resin. It is possible that the calcium hydroxide or oxide reacts with the hydroxyl groups of the phenol resin forming an inorganic-organic resin bond.

It is important that the amount of calcium oxide hydroxide or carbonate which is added, together with resorcinol following the condensation of the phenol and formaldehyde in the presence of the sulfite catalyst, be limited to an amount of about 0.006–0.060 mole per mole of formaldehyde in the condensed resin. This mole ratio of formaldehyde to calcium catalyst must be observed if the low exotherm upon hardener addition and the other beneficial properties of the resin are to be retained. If less than about 0.006 mole of calcium catalyst per mole of formaldehyde is used, the resin will not have the low exothermic cure upon hardener addition which is important in resin mixes. If greater than about 0.060 mole of calcium catalyst is used, there will result a precipitation of solid material from the resin mix which may be either the calcium hydroxide or salts of the resin.

It is this addition of the calcium catalyst which results in the low exotherm upon hardener addition. The amount of exotherm which is caused upon hardener addition is very important when the resin is mixed in bulk quantities. It has been found that the use of the calcium catalyst at the stage of resorcinol addition in our novel resin produces a resin which has a greatly reduced exotherm below that of resins formed without the calcium catalyst addition. This temperature difference is of great importance when using bulk quantities of such resin mixes, and it is the lowering of this exotherm which creates a commercially significant improvement. Even when using small quantities, such as 10–30 pound batches, the exotherm is decreased by as much as 7–10° C.

Figure 2:
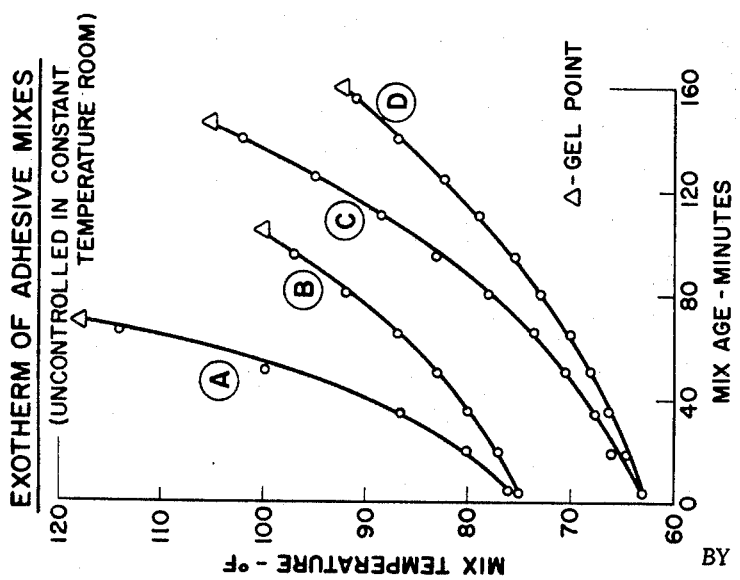
In FIGURE 2, there is illustrated the effect of the use of calcium catalyst as terminal catalyst in our process. Graphically illustrated is the reduced exotherm of the resin of the present invention in comparison with resins which do not have calcium catalyst added at the time of resorcinol addition.

An example of the effect of the calcium catalyst addition is shown in FIGURE 2, in which the exotherm is compared between a resin containing calcium hydroxide as terminal catalyst and one in which the terminal catalyst is absent. The temperature of adhesive mixes, uncontrolled on a wooden bench, in a constant temperature room (73.5° F.) were observed. Here, a resin to which calcium hydroxide was not added was tested in parallel with the resin of this invention. The temperature rise of 10-pound adhesive mixes, C and D, were prepared in one-gallon metal pails. The adhesive components were cooled to 60° F. prior to mixing. They were mixed for five minutes by hand with a woden paddle, and then at 15-minute intervals. In a second test, 30-pound mixes A and B were prepared in 5-gallon metal pails. The temperature of the components prior to mixing was 73° F. The adhesives were for 5 minutes with a low speed mechanical stirrer and then at 15-minute intervals. From the curves in FIGURE 2, it is apparent that the novel adhesive of this invention is less exothermic than the resin of U.S. 3,328,354.

The general procedure for preparing our novel resin, illustrated by flow diagram in FIGURE 1, is as follows. Formaldehyde (usually as a 37% aqueous solution) is mixed with the alkali metal sulfite catalyst, and the mixture is heated to dissolve the catalyst. For ease of operation, this done before the addition of phenol, although the phenol can be added initially. The phenol is charged to the reaction mixture with the pH of the mixture being maintained between 8.5–9.0 and the reaction mixture then refluxed until a viscosity of 22.7–50 poises is obtained. The extent of condensation is conveniently determined by following the viscosity during the condensation. The advancement of the condensation between the phenol and formaldehyde to a viscosity of 22.7–50 poises is required in order to obtain a low exothermic resin. This exceptionally high degree of condensation effectively ties the available phenol, thereby avoiding the odor problems prevalent in the art. Surprisingly, this high degree of phenol condensation (prior to resorcinol addition) provides an extremely reactive resin which can be formulated into an adhesive having a good pot life as well as rapid curing characteristics and characterized by a low exotherm upon hardener addition.

Upon reaching a viscosity of 22.7–50 poises, the calcium oxide or calcium hydroxide is added to the resin, preferably after the resin has been cooled to about 90° C. to more readily control the reaction, and the resorcinol is added to the reaction mixture. After the addition of the calcium catalyst and resorcinol, refluxing of the reaction mixture is continued until the resin reaches a constant viscosity in the order of 200–400 Gardner seconds.

This viscosity of the resin solution, i.e. 200–400 Gardner seconds, is extremely high compared to normal glue viscosity of adhesive mixes. To make the resin solution useful in the adhesive formulations, the resin is diluted with water or any water miscible solvent conventionally used in the adhesive art. Particularly useful are mixed solvents comprising water, lower aliphatic alcohols, and glycols. A typical solvent solution is made up of ethylene glycol, methanol and water in a ratio of 5:20:75 parts by weight. Another useful solvent solution is a mixture of ethylene glycol, ethyl alcohol and water in a ratio of 15:15:70 parts by weight. The resins of the invention are normally diluted with one of these solvent systems to a viscosity of 3.0–4.3 poises.

The resins are characterized by infinite dilutability. This dilutability characteristic is extremely important in evaluating the usefulness of particular phenol-resorcinol-formaldehyde resins. The resins of the invention, with their inifinite dilutability, are storage stable for nine months or more. The degree of dilutability also is a measure of washability of the ultimate adhesive. Resins, such as that of the present invention, which are infinitely dilutable are easily washed from the gluing equipment after assembly has been completed.

The novel adhesives are prepared by mixing the resin solution, adjusted to the desired viscosity as described, with paraformaldehyde hardener at a pH of 7.5–9.0 along with suitable fillers and extenders, if desired.

To provide useful pot life characteristics, it is necessary to use as a setting agent paraformaldehyde, either as such, or as one of its higher polymers, commonly referred to as alpha-polyoxymethylene and beta-polyoxymethylene. The higher polymers of paraformaldehyde are easily prepared by heating paraformaldehyde to a temperature of approximately 100° C., preferably in the presence of an acid catalyst, such as oxalic acid or a Lewis acid. The paraformaldehyde or polyoxymethylene is added to the adhesive mix in an amount sufficient to convert the resin into a water insoluble, infusible state. The minimum amount required is that sufficient to provide a total formaldehyde (including that initially condensed with the resin) to total phenolic compound mole ratio of greater than 1:1, preferably in the range of 1.3 to 2 moles of total formaldehyde to 1 mole of total phenolic compound.

The paraformaldehyde is conveniently added as a hardener portion of the adhesive mix along with the conventional extenders and fillers, such as walnut shell flour, wood flour and the like. Prior to the addition of the hardener portion, the pH of the adhesive mix is adjusted to 7.5–9.0 preferably by the addition of 50% aqueous caustic. If the pH of the adhesive mix is less than 7.5, the rapid curing characteristics are not obtained, while if the pH is greater than 9.0, the pot life is reduced.

The bonding characteristics of phenol-resorcinol-formaldehyde resins and adhesives are conveniently evaluated by a compression shear test (ASTM-D-905) and a vacuum pressure delamination test (MIL-A-397B). The numerical results of these tests depend upon the type of wood to be bonded. On Douglas fir, compression shear tests of bonds using the adhesive of the present invention show 85–90° wood failure. The wood failure of Southern pine is also in the order of 85–90%. In both cases, these results are considered to be excellent. The bond provided by the adhesives of the present invention shows, according to the vacuum pressure delamination tests, less than 1% delamination of Douglas fir and Southern pine.

Our invention is further illustrated by the following examples.

EXAMPLE I

A phenol-resorcinol-formaldehyde resin was prepared according to the following charge schedule:

| Charge | Moles | Pounds |
|---|---|---|
| Formaldehyde (37%) | 35.75 | 2,899 |
| Sodium Sulfite | 2.695 | 340 |
| Phenol (90%) | 38.5 | 4,021 |
| Resorcinol, Tech | 16.5 | 1,815 |
| Calcium Hydroxide [95.4% Ca(OH)$_2$] | 0.5775 | 45 |
| | | 9,120 |

The ingredients were added in the following mole ratios:

Ingredient:                          Mole ratio
   Phenol:resorcinol:formaldehyde        70:30:65
   Formaldehyde:sodium sulfite           1:0.075
   Formaldehyde:calcium hydroxide       1:0.016

Formaldehyde was charged to a 1,000-gallon kettle, fitted with a recirculating pump and stirrer, to which the sodium sulfite was gradually added over about 15–30 minutes. The agitation was commenced and the mixture maintained at a temperature of 26–32° C. for 30 minutes. The phenol was charged to the reactor and the pH determined and found to be 8.9. The mixture was then heated to reflux and, at about 30-minute intervals, the viscosity changes noted. When the viscosity reached U–V (2.7 hours) the reaction mixture was cooled to 90° C. and the reaction continued at 90° C. with viscosity determinations at 0.25 hour intervals. When a viscosity of Z1 (27.0 poises) was obtained, 1.25 hour, a slurry of the calcium hydroxide in 100 pounds of water was added, followed by the resorcinol. The mixture was heated to reflux, and the reflux continued, after closing vents on the reactor, at a pressure of about 13–15 p.s.i.g. (120° C.). The viscosity was determined at 0.25 hour intervals, and when a viscosity of 223 Gardner seconds was reached (after about 4.0 hours) the mass was cooled. At about 95° C., 1875 pounds of water and 125 pounds of ethylene glycol were added to dilute the resin. When the temperature had fallen to 55° C., 500 pounds of methanol were added. The viscosity was adjusted to N–O (3.4–3.7 poises) by the addition of a solvent mixture of 5 parts ethylene glycol, 20 parts methanol and 75 parts of water. The pH of the resin (7.8) was then adjusted to a pH of 8.0 by the addition of a 50% caustic soda solution.

EXAMPLE II

The resin of Example I was treated with a setting agent comprising heat treated paraformaldehyde (polyoxymethylene), 46.35 parts; wood flour, 8.20 parts; and walnut shell flour, 45.45 parts. Prior to being used in the setting agent, the paraformaldehyde was treated with colloidal silica and oxalic acid at a temperature of 100–104° C. under reduced pressure to form a polyoxymethylene. Various polyoxymethylenes which can be used in the setting agent are described by Carlton Ellis in "The Chemistry of Synthetic Resins," New York, 1935, pp. 511–516. The gel time for the adhesive is found to be in the range of 100–225 minutes.

The adhesive prepared by the above procedure had a pH of 8.1, a viscosity of 4.0 poises, a solids content of 40%; infinite dilutability, and a gel time of 200 minutes at 73° F. It was further characterized as having a low phenol and formaldehyde odor, excellent washability, a low exotherm addition of curing agent, and excellent bonding properties as shown in the table below.

| | Shear Strength ASTM D-905 | | Vacuum Pressure Delamination, Percent MIL-397B |
|---|---|---|---|
| | P.s.i. | Percent wood failure | |
| Douglas Fir | 1,200 | 90 | 0.1 |
| Southern Pine | 1,525 | 85 | 0.5 |

In determining exotherm, the following procedure was used. Two hundred grams of resin syrup and 40 grams of hardener (paraformaldehyde) both at 73.5° F., were mixed for five minutes. One hundred and eighty grams of the mixed adhesive were weighed into a No. 21 x 300 metal can and placed on a wooden bench in a constant temperature room (73.5° F.). The adhesive is thoroughly mixed every 15 minutes, the temperature of the adhesive mix and the ambient temperature recorded. The maximum temperature and the gelation time of the uncontrolled mix demonstrate the adhesive's exothermic nature and are recorded. The results are listed as maximum temperature/minutes to gel. The exotherm of the resin of Example I was found to be 27.9° C./140 min.

EXAMPLE III

A phenol-resorcinol-formaldehyde resin was prepared generally according to Example I of U.S. 3,328,354. The mole ratio of the phenol:resorcinol:formaldehyde was 80:20:62, and the condensation of the phenol-formaldehyde mixture was carried out to a viscosity of 22.7 (Z on the Gardner Scale), before the addition of the resorcinol. There was no calcium oxide or calcium hydroxide added to the resin at the time of resorcinol addition. The resulting resin had a gel time of about 265 minutes. The exotherm which resulted upon the addition of hardener, determined as in Example II of the present application, was 34° C.

There is thus illustrated the reduction in the exotherm when employing the resins of the present invention as compared with resins which are formed without the addition of calcium oxide or calcium hydroxide at the time of resorcinol addition.

EXAMPLE V

In order to illustrate the importance of adding the calcium hydroxide or calcium oxide at the time of resorcinol addition, following condensation of the phenol-formaldehyde resin to a viscosity of about 22.7, the following experiment was carried out. A phenol-formaldehyde-resorcinol resin was prepared from the following charge.

| Charge | Moles | Grams |
|---|---|---|
| Phenol (90%) | 17.5 | 1,821.0 |
| Formaldehyde (36.9%) | 15.5 | 1,200.0 |
| Sodium Sulfite | 1.085 | 136.0 |
| Calcium Oxide | 1.085 | 60.7 |
| Resorcinol | 7.5 | 825.0 |
| | | 4,102.7 |

The ingredients were added in the following mole ratios:

| Ingredient: | Mole ratio |
|---|---|
| Phenol:resorcinol:formaldehyde | 70:30:62 |
| Formaldehyde:sodium sulfite | 1:0.070 |
| Formaldehyde:calcium oxide | 1:0.070 |

The phenol and the calcium oxide were charged to a reactor and stirred for 30 minutes. There was then added the formaldehyde and sodium sulfite and stirring for 30 minutes followed. The mixture was then heated to reflux to a viscosity of 27.0 (2.5 hours). The mixture was cooled to 80° C. and the resorcinol added. The heat was applied and reflux continued. The viscosity of the resin did not level off at any point, but rather after 4 hours reflux, the resin gelled.

EXAMPLE V

An experiment was made using calcium oxide as the terminal catalyst.

| Charge | Moles | Grams |
|---|---|---|
| Formaldehyde (36.6%) | 13 | 1,066.39 |
| Phenol (90%) | 14 | 1,463.93 |
| Resorcinol, Tech. | 6 | 660.66 |
| Sodium Sulfite | 0.98 | 123.19 |
| Calcium Oxide | 0.21 | 11.78 |

The ingredients were added in the following mole ratios:

| Ingredient: | Mole ratio |
|---|---|
| Phenol:resorcinol:formaldehyde | 70:30:65 |
| Formaldehyde:sodium sulfite | 1:0.075 |
| Formaldehyde:calcium oxide | 1:0.015 |

The formaldehyde and sodium sulfite were charged to a stirred reactor and mixed for ½-hour at room temperature. The phenol was then charged to the reaction mixture, heat applied, and the mixture refluxed (101–103° C.) for 3.5 hours until a viscosity of Z–3 (46.3) was obtained. The mixture was cooled to 80° C. and the calcium oxide and resorcinol added to the reaction mixture with stirring. Refluxing was continued (about 102° C.) for a period of 10.5 hours. The resin was diluted with a 5/20/75 mixture of ethylene glycol, Solox and water as solvent, to a viscosity of about 3.2. The resulting resin had an exotherm caused by addition of hardener to the resin of only 26.1° C./137 min.

We claim:

1. A method of making a soluble fusible phenol-resorcinol-formaldehyde resin solution characterized by infinite dilutability and which produces a low exotherm upon hardener addition, which resin comprises 50–95 moles of phenol and 5–50 moles of resorcinol per 100 moles of total phenol and resorcinol and 0.55–0.75 mole of formaldehyde for each mole total phenol and resorcinol, said resin being prepared by the steps comprising:
   (a) reacting said phenol and said formaldehyde at an initial pH of 8.5–9.0 and in the presence of sodium sulfite catalyst in an amount of 0.04–0.09 mole per mole of formaldehyde;
   (b) heating the reaction mixture to reflux until the mixture has a viscosity of 22.7–50 poises;
   (c) adding said resorcinol and 0.006–0.060 mole per mole of formaldehyde of a catalyst selected from the group consisting of calcium oxide, calcium hydroxide and calcium carbonate and continuing refluxing until the resin has a constant viscosity of 200–400 Gardner seconds; and
   (d) diluting said resin with a miscible solvent to give a solution having a solids content of 40–60% by weight and a viscosity of 3.0–4.3 poises.

2. A soluble fusible phenol-resorcinol-formaldehyde resin solution, characterized by infinite dilutability and which produces a low exotherm upon hardener addition, which comprises 50–95 moles of phenol with 5–50 moles resorcinol per 100 moles of total phenol and resorcinol and 0.55–0.75 mole of formaldehyde for each mole total phenol and resorcinol, said resin being prepared by the steps comprising:
   (a) reacting said phenol and said formaldehyde at an initial pH of 8.5–9.0 and in the presence of an alkali metal sulfite catalyst in an amount of 0.04–0.09 mole per mole of formaldehyde;
   (b) heating the reaction mixture to reflux until the mixture has a viscosity of 22.7–50 poises;
   (c) adding said resorcinol and 0.006–0.060 mole per mole of formaldehyde of a catalyst selected from the group consisting of calcium oxide, calcium hydroxide, and calcium carbonate and a continuing refluxing until the resin has a constant viscosity of 200–400 poises.

3. A method of making a phenol-resorcinol-formaldehyde adhesive which comprises a resin solution characterized by infinite dilutability which produces a low exotherm on hardener addition, of 50–95 moles of phenol with 5–50 moles resorcinol per 100 moles of total phenol and resorcinol and 0.55–0.75 mole of formaldehyde for each mole total phenol and resorcinol together with a curing agent, said adhesive being prepared by the steps comprising:
   (a) reacting said phenol and said formaldehyde at an initial pH of 8.5–9.0 and in the presence of an alkali metal sulfite in an amount of 0.04–0.09 mole per mole formaldehyde;
   (b) heating the reaction mixture to reflux until the mixture has a viscosity of 22.7–50 poises;
   (c) adding said resorcinol and 0.006–0.060 mole of a catalyst selected from the group consisting of calcium oxide, calcium hydroxide and calcium carbonate and continuing refluxing until the resin has a constant viscosity of 200–400 poises;
   (d) diluting said resin with a water miscible solvent to give a solution having a solids content of 40–60% by weight and a viscosity of 3.0–4.3 poises;
   (e) adjusting the pH of the resin solution to 7.5–8.9;
   (f) reacting said resin solution with a curing agent selected from the group consisting of paraformaldehyde and polyoxymethylene to cure the resin to a crosslinked insoluble infusible state.

4. A method according to claim 3 wherein said alkali metal sulfite is sodium sulfite and said curing agent is polyoxymethylene.

References Cited

UNITED STATES PATENTS

| 2,489,336 | 11/1949 | Spahr et al. | 260—54 |
| 3,328,354 | 6/1967 | Dietrick | 260—54 |

WILLIAM H. SHORT, *Primary Examiner.*

H. SCHAIN, *Assistant Examiner.*

UNITED STATES PATENT OFFICE
CERTIFICATE OF CORRECTION

Patent No. 3,389,125                                                            June 18, 1968

Myron I. Dietrick et al.

It is certified that error appears in the above identified patent and that said Letters Patent are hereby corrected as shown below:

Column 8, lines 25 and 45, "400 poises", each occurrence, should read -- 400 Gardner seconds --.

Signed and sealed this 2nd day of December 1969.

(SEAL)
Attest:

Edward M. Fletcher, Jr.
Attesting Officer

WILLIAM E. SCHUYLER, JR.
Commissioner of Patents